United States Patent [19]
Shirasaki

[11] Patent Number: 5,276,701
[45] Date of Patent: Jan. 4, 1994

[54] RING LASER EMPLOYING UNIDIRECTIONAL ATTENUATOR

[75] Inventor: Masataka Shirasaki, Belmont, Mass.

[73] Assignees: Fujitsu Limited, Kawasaki, Japan; Massachusetts Institute of Technology, Cambridge, Mass.

[21] Appl. No.: 946,916

[22] Filed: Sep. 18, 1992

[51] Int. Cl.$^5$ .................. H01S 3/083; H01S 3/098; G02B 6/26
[52] U.S. Cl. .................. 372/94; 372/6; 372/18; 372/27; 359/483; 385/140
[58] Field of Search .................. 372/94, 6, 18, 11, 27; 385/140; 359/483, 484, 501

[56] References Cited

U.S. PATENT DOCUMENTS

| | | | |
|---|---|---|---|
| 4,973,120 | 11/1990 | Jobson et al. | 359/184 |
| 5,050,183 | 9/1991 | Duling. III | 372/6 |

Primary Examiner—Rodney B. Bovernick
Assistant Examiner—Robert McNutt
Attorney, Agent, or Firm—Wolf, Greenfield & Sacks

[57] ABSTRACT

A mode locked fiber ring laser comprising an optical fiber, an output mirror, a partially reflective/partially transmissive mirror and a unidirectional attenuator. The unidirectional attenuator comprises, in sequence, a first linear polarizer, with its polarization axes at 0°, a first quarter wave plate with its axis at $\theta°$, a non-reciprocal rotator for rotating the polarization of incident light by $\gamma°$, a second quarter wave plate with its axis accented at $(\theta+\gamma+90)°$ and a second linear polarizer with its polarization axis at $\gamma°$. The parameters $\theta$ and $\gamma$ are selected to provide a desired relative phase shift between counter-propagating beams in the fiber and to attenuate the beam in one of the directions so as to create an additive pulse mode-locked (APM) type passive mode locking system.

15 Claims, 5 Drawing Sheets

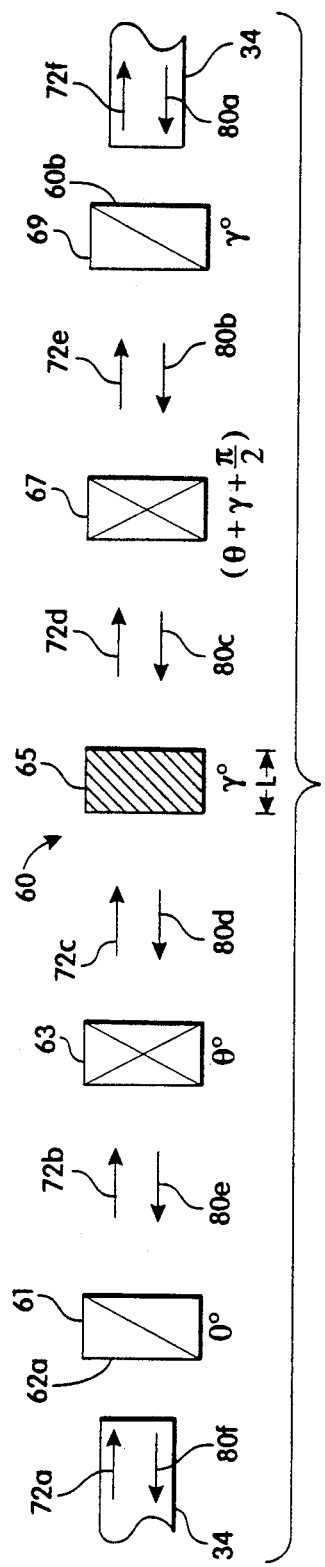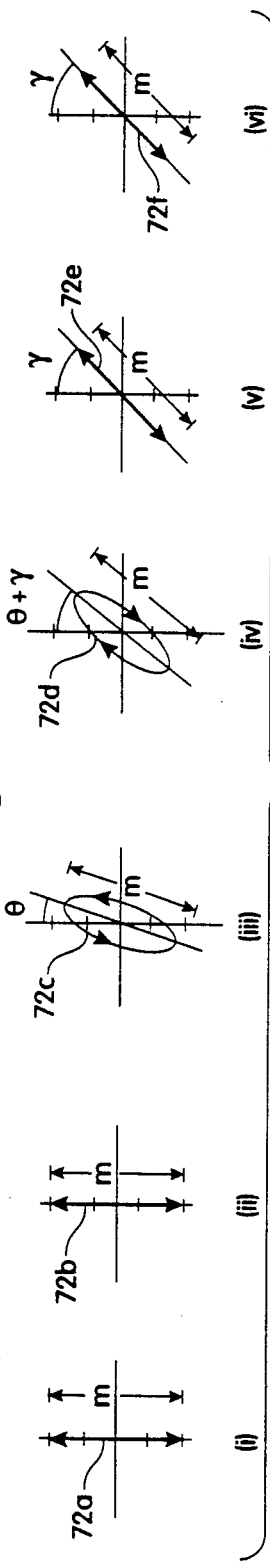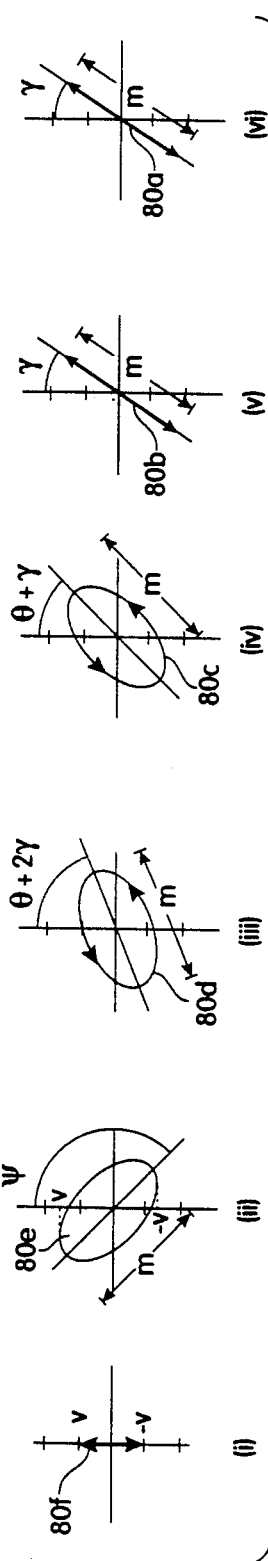
Fig. 4
Fig. 5A
Fig. 5B

RING LASER EMPLOYING UNIDIRECTIONAL ATTENUATOR

FIELD OF THE INVENTION

The invention relates to optical ring lasers, and more particularly to mode locked pulsed output optical ring lasers.

BACKGROUND OF THE INVENTION

Lasers having pulsed outputs can be constructed by using mode locking in the laser cavity. The light which is amplified in a laser cavity can be forced to form a pulsed pattern by causing a particular interference between the many equally frequency spaced modes which exist in the cavity.

A laser may very broadly be considered to be a gain medium within a resonator. Essentially, a beam of light passing through a gain medium stimulates the medium to release its stored energy in the form of additional light coherent with the input beam, thus amplifying the beam. Feedback is achieved by placing the gain medium within a resonator, e.g., a pair of parallel mirrors that reflect the beam back and forth towards each other through the gain medium. The light generated by such a laser is coherent but comprises a plurality of discrete wavelengths corresponding to different resonant frequencies, or modes, of the resonator. A portion of the light which is generated in the laser cavity is allowed to pass out of the cavity as the output beam. One of the mirrors, for instance, may be partially transmissive, wherein the light transmitted through the mirror is the output signal.

The output of such a laser as a function of time depends on the amplitudes, frequencies and relative phases of the different modes in the laser cavity. If these parameters are uncontrolled, then the output of the laser will be random in time. However, by controlling these parameters, the output of such a laser can be very finely controlled. For instance, if the modes in a laser cavity maintain equal frequency spacing and a fixed phase relationship to each other, the output of the laser as a function of time will vary in a very predictable manner. A laser in which the amplitudes, frequencies and/or relative phases of the modes are controlled to produce a specific output is said to be a mode-locked laser. The output will be dependent upon which modes are oscillating and the phase relationship between these modes.

Most commonly, mode-locking is used to generate pulsed-output lasers in which the output is a series of evenly spaced pulses of equal magnitude with a zero output between the pulses. Such a time domain output of evenly spaced pulses of equal magnitude is the result of a frequency domain characteristic of equal frequency spacing and phase among the various modes (i.e., mode locking). Various means are known for mode-locking lasers, both by active mode locking and passive mode locking. Active mode locking refers to a method in which the means for controlling the phases in the cavity is externally controlled. In passive mode-locking, phase control is accomplished automatically within the cavity.

To produce a pulsed output, it is necessary that the various modes traveling in the cavity have the same phase. The various modes in a cavity can be represented as $e^{i\omega t + \phi}$. Accordingly, if we assume that there are three modes resonating in a laser cavity, the output of the laser can be represented as $$e^{i\omega_0 t + \phi_0} + e^{i\omega_1 t + \phi_1} + e^{i\omega_2 t + \phi_2}$$

where $\omega_0$, $\omega_1$ and $\omega_2$, are different frequency harmonics and $\phi_0$, $\phi_1$ and $\phi_2$ define the relative phase differences of the three modes. If $\phi_0$, $\phi_1$ and $\phi_2$ can be made equal, then the laser will be mode-locked with a pulsed output where the pulses are evenly spaced and of equal magnitude.

Mode-locking can be accomplished by loss modulation, gain modulation or phase modulation. All three types of modulation have been employed in the prior art. The present invention is primarily concerned with loss modulation.

FIG. 1 broadly illustrates a basic active mode-locked laser utilizing an optical gate as a loss modulator. The cavity 10 comprises mirrors 12 and 14 at opposite ends and an intensity modulator 16 somewhere in the cavity. An intensity modulator basically is a medium in which the transmission/absorption ratio, i.e., transmissivity, can be changed in time. For instance, one common type of loss modulator is an electro-optic crystal coupled to a voltage source such as voltage source 18 illustrated in FIG. 1. The transmissivity of the crystal is dependent on the voltage applied across it. Thus, by varying the output of the voltage source 18 in time, the transmissivity of the crystal 16 is also varied in time. For the sake of simplicity, it will be assumed that the crystal can be controlled to have a transmissivity/absorption ratio which is sinusoidal in time. By controlling voltage source 18 such that there is high loss for all wave forms within the cavity except the pulse shape, the desired output pattern of regularly spaced pulses of equal magnitude can be produced. Mode locking is achieved by modulating the transmissivity of the crystal 18 at a period which is carefully adjusted to match the period of time necessary for light to travel round trip in the cavity. In this case, the light incident on the modulator 16 during the point in the modulator's cycle when it has high transmissivity will again be incident at the same point in the modulator's cycle after one round trip in the cavity. By the same token, light incident on the modulator when it has low transmissivity will always strike the modulator when it has low transmissivity because its round trip time to return to the modulator is equivalent to the modulator's cycle time. With this type of modulation, light tends to build up in narrow pulses in the portion of the light which experiences high transmissivity in the modulator.

In the frequency domain, the above described mode locking system is as follows. When cavity mode n having frequency $\omega_n$ is modulated sinusoidally at frequency $\Omega$, side bands appear at frequencies of $\omega_n \pm \Omega$. Mode-locking occurs when $\Omega$ closely matches the mode spacing, $\Delta$. The condition $\Omega = \Delta$ is equivalent to the condition that the modulation period match the cavity round trip period. When $\Omega = \Delta$, the side bands created from mode n act as injection signals for modes n+1 and n−1. The modulation tends to ensure that a large number of modes oscillate. For example, starting with only a single mode at frequency $\omega_0$, the modulation produces side bands that feed modes at $\omega_0 \pm \Delta$. The side bands generated from these modes in turn provide injection signals for modes at $\omega_0 \pm 2\Delta$, and so on. Further, the result of the injection-locking process is a fixed and stable set of mode amplitudes, frequencies and phases. This corresponds in the time domain to a train of short pulses, with pulse separation equal to the modulation period and pulse width equal to the pulse separation divided by the number of oscillating modes.

Other techniques of active mode locking are also known. Active mode locking by phase modulation, for instance, is known but is no longer in common use. Some such techniques are discussed in *Encyclopedia of Lasers and Optical Technology;* Academic Press, Inc.; Robert A. Meyers, Editor; 1991; pp. 305-318.

Mode locking may also be achieved in a passive manner. In passive mode-locking, the modulator is a non linear optical element that is responsive to the mode locked pulses themselves.

In passive mode locking, instead of an externally driven modulator, a non linear optical element (i.e., an element having transmissivity dependent upon the intensity of the light in the non linear element) is used. FIG. 2 broadly illustrates a type of passive mode locked laser cavity which is commonly referred to as an additive pulse mode locked (APM) laser. In this type of passive mode locking, the generation of pulses is achieved by a different operation than in active mode locking. In this system, two beams are caused to interfere with each other so as to cause the light to be mode locked (i.e., to maintain equal frequency spacing and a fixed phase relationship) which, in turn, results in a particular time domain output (such as evenly spaced pulses of equal magnitude).

The cavity 20 comprises mirrors 22 and 24 at opposite ends thereof. In addition, there is a third mirror 26 positioned somewhere near the middle of the cavity (but not the exact middle). Mirror 26 is chosen to have a specific desired transmission/reflection ratio. For purposes of example, it is assumed that mirror 26 reflects 90% of light beam 28 incident upon it and transmits the remaining 10%. To the right of mirror 26, the cavity comprises a gain medium 21 which is linear. To the left of mirror 26, the cavity comprises a non-linear medium 23 in which the speed of propagation is dependent upon the intensity of the light in the medium. Mirror 26 need not necessarily be positioned at the interface between non linear medium 23 and linear medium 21 but could be placed anywhere in the cavity. Medium 23 is a non linear medium for which the speed of propagation usually decreases with increasing intensity. Accordingly, non-linear medium 23 imparts a non-linear phase shift to light traveling through it. Non-linear medium 23, for instance, may be an optical fiber.

Accordingly, light 32 traveling through non-linear medium 23 experiences non-linear phase shift relative to beam 30 which does no travel through medium 23. Of course, when beams 30 and 32 meet again at point 27, beam 32 additionally has experienced a phase shift relative to beam 30 due to the difference in path lengths traveled by beams 30 and 32, i.e., length L of non-linear medium 23. The relative phase shift between beams 30 and 32 is due to both linear and non linear phase shift. The non linear phase shift is a function of 1) the length of non-linear medium 23; 2) the non-linear properties of medium 23; and 3) the intensity of beam 32. The relative linear phase shift between beams 30 and 32 is a function of the difference in optical path length of beams 30 and 32 (which in turn, is a direct function of the distances between mirrors 22 and 26 and between mirrors 24 and 26). The exact values and relationship of all of these factors depends on the desired output as well as practical design considerations and can be calculated in a manner which is known in the prior art.

The length L of medium 23 must be precisely determined and set such that the resulting sum phase shift of both the linear and non linear effects is the desired shift for causing the desired interference between beams 30 and 32 to force light in the cavity to evolve into the desired output pattern of equal frequency spacing and fixed phase relationship for mode locking. Commonly, the appropriate length is determined by empirical means, i.e., experimentation. Most commonly, active feedback is used to adjust L to the appropriate length for obtaining the desired output signal. The process of determining and setting length L is difficult and time consuming.

Accordingly, it is an object of the present invention to provide an improved mode locked laser.

It is another object of the present invention to provide a passive mode locked ring laser in which it is not necessary to precision adjust the length of the cavity.

SUMMARY OF THE INVENTION

The invention comprises a passive mode locked ring laser employing a unidirectional attenuator to achieve mode locking. More particularly, the present invention is an APM ring laser. In the preferred embodiment, the structure comprises an optical fiber ring doped with an appropriate dopant such as Erbium so as to comprise a lasing gain medium for the light. However, the ring cavity need not be an optical fiber. The structure further comprises a partially reflective/partially transmissive mirror, an output mirror and a unidirectional attenuator in the light path in the ring. The unidirectional attenuator comprises, in sequence, a first polarizer coupled to a facet of the fiber ring, a first quarter wave plate, a non reciprocal rotator, a second quarter wave plate, and a second polarizer coupled to another facet of the fiber ring. Assuming that (1) the first polarizer has a polarization angle of 0°, (2) the first quarter wave plate is oriented at $\theta°$ relative thereto and (3) the non-reciprocal rotator imparts a rotation of $\gamma°$ to light incident upon it, then the second quarter wave plate is oriented at an angle $(\theta+\gamma+90)°$ and the second polarizer is oriented at $\gamma°$. Light passing through this unidirectional attenuator in the direction from the first polarizer to the second polarizer (Light A) passes through unattenuated. However, light passing through the attenuator in the other direction (Light B) is attenuated and phase shifted relative to the oppositely traveling light. The relationship of the amplitude of Light A to Light B is given by:

$$\frac{\text{Light } B}{\text{Light } A} = \cos 2\gamma + i \cdot \sin 2\theta \cdot \sin 2\gamma$$

Accordingly, the relative intensity of Light B relative to the Light A is given by $$\text{Relative Intensity} = (\cos 2\gamma)^2 + (\sin 2\theta \cdot \sin 2\gamma)^2$$

where
A = amplitude of Light A, and
B = amplitude of Light B,
and the relative phase shift between Light A and Light B is given by;

$$\text{Relative phase shift} = \text{Arctan}\left(\frac{\sin 2\theta \cdot \sin 2\gamma}{\cos 2\gamma}\right)$$

In a preferred embodiment of the invention, the fiber is a linear polarization maintaining fiber twisted so as to perfectly couple the polarization axis of the fiber to each of the polarizers of the unidirectional attenuator. In an embodiment utilizing a high quality polarization maintaining fiber, one of the polarizers may be eliminated.

BRIEF DESCRIPTION OF THE DRAWINGS

FIG. 4 illustrates the unidirectional attenuator of the present invention.

FIGS. 5A (i)–5A (vi) are graphical representations of the polarization of light passing through the unidirectional attenuator of FIG. 4 in a first direction.

FIGS. 5B (i)–5B (vi) are graphical representations of the polarization of light passing through the unidirectional attenuator of FIG. 4 in a second direction.

DETAILED DESCRIPTION OF A PREFERRED EMBODIMENT OF THE INVENTION

Figure 1:
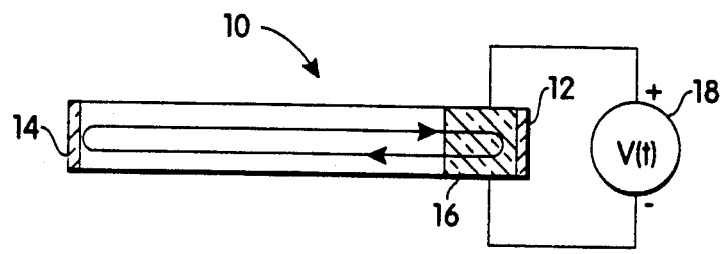
FIG. 1 illustrates an exemplary active mode-locked laser of the prior art.
Figure 2:
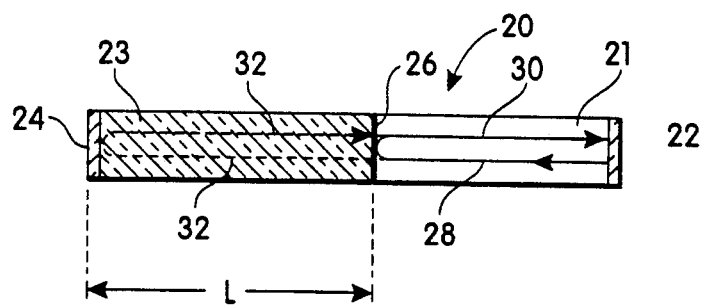
FIG. 2 illustrates an exemplary APM type passive mode-locked laser of the prior art.
Figure 3:
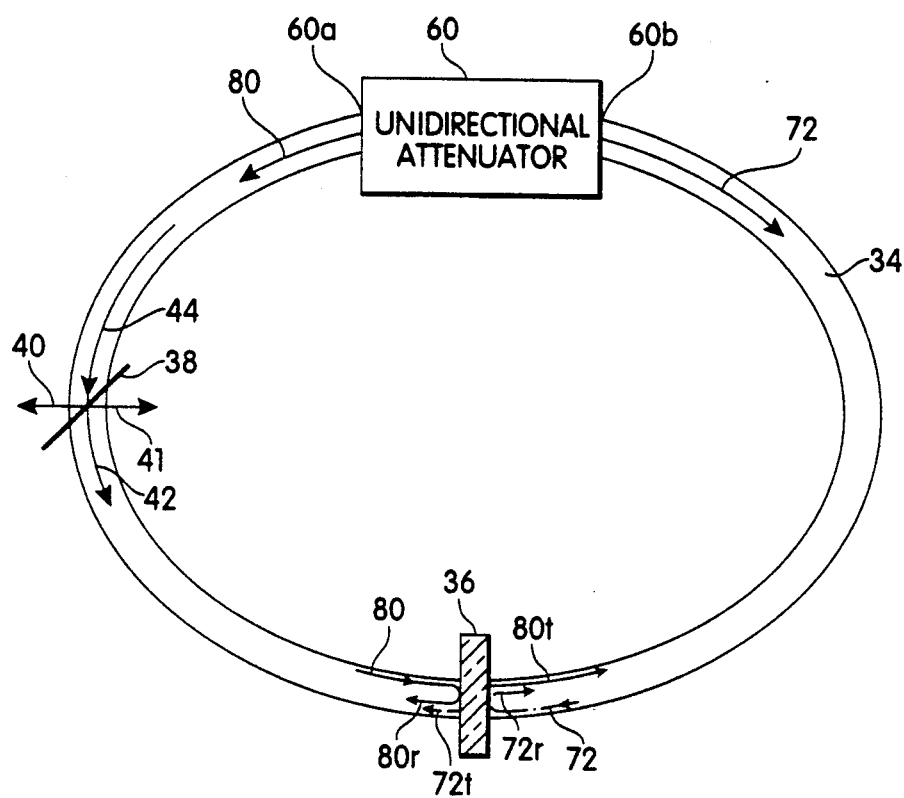
FIG. 3 illustrates the laser of the present invention.

FIG. 3 illustrates an exemplary APM ring laser of the present invention employing an optical fiber as the ring cavity and a unidirectional attenuator. In this type of laser, two beams traveling in opposite directions around the ring are used to create an interference pattern and cause the desired APM action. The ring laser of the present invention comprises an optical fiber loop 34 which is doped to provide gain. The fiber should be non linear so as to cause non linear phase change in light traveling through it. In a preferred embodiment of the invention, the fiber is heavily doped with Erbium. Other dopants for creating a lasing gain medium are well known in the prior art and also may be used.

The laser also comprises a unidirectional attenuator 60, which, as will be explained in greater detail, imparts both a relative attenuation and relative phase shift between counter-propagating beams in the laser. The laser also comprises an output coupler 38 for removing a portion of the light in the loop 34 as an output signal 40. Output coupler 38, for instance, may be a partially reflective/partially transmissive mirror which splits incident beam 44 into reflected light beam 40 which becomes the output light and transmitted light beam 42 which remains in the loop. Light traveling in the opposite direction (not shown in the vicinity of output mirror 38) is also split so as to create a second output beam 41. Beam 41, however, is considered wasted light which is not used in most laser applications. In a preferred embodiment of the invention, output mirror 38 removes approximately 10-20% of the incident light 44 from the cavity as output light 40.

The laser further comprises a second partially reflective/partially transmissive mirror 36. Mirror 36 splits counter clockwise traveling incident beam 80 into reflected beam 80r and transmitted beam 80t. Transmitted beam 80t continues to travel around the loop in the counter clockwise direction while reflected beam 80r is reversed in direction to travel around loop 34 in the clockwise direction. Incident light 72 on mirror 36 from the other direction, i.e., the clockwise direction, is also partially reflected (beam 72r) and partially transmitted (beam 72t). Light in reflected beam 80r will interfere with light in transmitted beam 72t in the clockwise direction. Likewise, reflected beam 72r and transmitted beam 80t in the counter-clockwise direction will also interfere with each other.

Additive pulse mode locking (APM) for generating the desired output is caused by choosing the appropriate values for the following factors; (1) the intensity of each of the counter propagating beams, (2) the relative intensity of the beams to each other, and (3) the relative phase change between the counter propagating beams. The intensity of each of the counter propagating beams as well as their relative intensity to each other is a function of the reflectivity/transmissivity ratio of mirror 36 and the relative attenuation caused by the unidirectional attenuator 60. The relative phase change of the counter propagating beams is a function of (1) the non-linear properties of the particular fiber selected; (2) the intensities of each of the counter propagating beams in the fiber; and (3) the relative phase shift between the counter propagating beams imparted by unidirectional attenuator 60. As will be explained in more detail, the relative phase shift imparted by unidirectional attenuator 60 is constant. Of course, the relative phase shift resulting from the non linear properties of the fiber 34 are not constant, but depend on the intensity of the particular light.

As previously mentioned, to cause additive pulse mode locking so as to achieve a time domain pulse train output of evenly spaced pulses of equal magnitude, the desired frequency domain characteristic is a plurality of modes in phase with each other and having equal frequency spacing.

The original input light to this laser may simply be built up from noise or, alternately, may be injected. Since light traveling in either direction through the loop travels over the exact same path, i.e., the exact same distance, the relative phase between, for instance, beam 80r and beam 72t is not affected by change in the path length of the beams since any change in the path length of beam 80r would also result in the exact same change in the path length of beam 72t. Accordingly, the relative path lengths cannot be changed and, therefore, there is no need in the present invention to precision set the cavity length. Thus, different means are employed in the present invention for imparting a constant relative phase shift between the counter-propagating beams in the ring.

Unidirectional attenuator 60, as illustrated in FIGS. 3 and 4, attenuates and phase shifts light traveling through it in a first direction, but leaves unchanged light traveling through it in the opposite direction. Attenuator 60 comprises, in sequential order from left to right in FIG. 4, 1) a first polarizer 61, 2) a first quarter wave plate 63, 3) a non-reciprocal rotator 65, 4) a second quarter wave plate 67, and 5) a second polarizer 69. A light beam traveling through the attenuator 60 from left to right, such as beam 72 in FIG. 4, is not attenuated. A light beam traveling through attenuator 60 from right to left, such as beam 80 in FIG. 4, experiences both phase shift and attenuation relative to beam 72.

For ease of explanation, it will be assumed herein that the first polarizer 61 is oriented at an angle of 0°. All other angles are expressed in terms of relative angle from the polarization axis of polarizer 61. Light beam 72a traveling in the clockwise direction through fiber 34 and having amplitude M impinges upon linear polarizer 61 and is linearly polarized with an axis of 0°, as illustrated by FIG. 5A(ii). It should be noted that, in a preferred embodiment of the invention, the fiber 34 is a linear polarization maintaining (1 pm) fiber. If an 1 pm fiber is used, then the axis of polarization of the fiber should be coupled identically with the axis of polarizer 61. Accordingly, if an 1 pm fiber is used, input light beam 72a to polarizer 61 will already be polarized at 0° as illustrated at 72a in FIG. 5A(i) and thus will not be affected by polarizer 61. In fact, if an 1 pm fiber is used, then, at least ideally, one of polarizers 61 and 69 can be eliminated since the fiber itself will maintain light in whatever polarization the light was when introduced into the fiber. Accordingly, only one polarizer would be necessary as long as the 1 pm fiber is twisted $\gamma°$ between interfaces 60a and 60b of the attenuator 60.

In any event, quarter wave plate 63 is oriented at an angle $\theta°$ relative to the angle of the linear polarizer 61. As such, it converts linear polarized beam 72b along the 0° axis to the elliptical polarized beam 72c oriented with its major axis at $\theta°$, as illustrated in FIG. 5A(iii). Non-reciprocal rotator 65 rotates the polarization by an angle $\gamma°$. Nonreciprocal rotator 65 may be a Faraday rotator employing, for instance, a crystal medium In at least one type of Faraday rotator, a crystal medium placed in a magnetic field causes the polarization of an incident light beam to be rotated by an angle which is a function of the length, L, of the crystal. Other types of non reciprocal rotators are also theoretically possible. The Faraday rotator 65 rotates the axis of the elliptical polarization of beam 72c by $\gamma°$ in the clockwise direction as illustrated in FIG. 5A(iv). Beam 72d then passes through quarter wave plate 67 which has an axis oriented at $(\theta+\gamma+90)°$ so as to change elliptically polarized light beam 72d oriented at $(\theta+\gamma)°$ to a linearly polarized light beam oriented at an angle $\gamma°$, as illustrated in FIG. 5A(v). Finally, linear polarizer 69 is oriented with its axis at $\gamma°$ so as to 100% transmit beam 72e, without any attenuation, into the fiber 34 as illustrated in FIG. 5(vi). Thus, linearly polarized input light at facet 60a oriented at 0° exits the opposite end of the attenuator as linearly polarized light at $\gamma°$ having the same intensity as the input light.

Of course, as mentioned above, if fiber 34 is an 1 pm fiber, then polarizer 69 may be eliminated. Whether polarizer 69 is eliminated or not, if an 1 pm fiber is used, it should be coupled to the attenuator such that the polarization axis of the light in the fiber is $\gamma°$. Accordingly, if fiber 34 is an 1 pm fiber, it must have a $\gamma°$ twist in it between facets 60a and 60b of attenuator 60.

Light traveling through attenuator 60 in the opposite direction, e.g., the counter clockwise direction, is phase shifted and attenuated relative to the input light.

FIG. 5B illustrates the polarization and attenuation of light beam 80 traveling in the opposite direction through attenuator 60. As illustrated in FIGS. 5B(v) and 5B(vi), linearly polarized light 80b oriented at angle $\gamma°$ is output from linear polarizer 69. If an 1 pm fiber is used and is perfectly coupled to axis $\gamma$, then the input light 80a from the fiber 34 passes through linear polarizer 69 unaffected. In any event, when light beam 80b passes through quarter wave plate 67, it becomes elliptically polarized with its major axis at $(\theta+\gamma)°$, as illustrated at 80c in FIG. 5B(iv).

Since rotator 65 is a non-reciprocal rotator, light traveling through it in this direction also is rotated in the clockwise direction by $\gamma°$. A reciprocal rotator, on the other hand, would rotate a beam traveling through it in one direction, e.g., clockwise and would rotate a beam traveling in the opposite direction, e.g., counter-clockwise. For reasons which will become apparent, the present invention requires a non-reciprocal, as opposed to a reciprocal, rotator. Thus, Faraday rotator 65 rotates the polarization of beam 80c by $\gamma°$ in the clockwise direction to produce beam 80d which is elliptically polarized at angle $(\theta+2\gamma)°$ as illustrated in FIG. 5B(iii).

When beam 80d passes through quarter wave plate 63, whose axis is oriented at $\theta°$, it is not turned into linear polarization as would have been the case if a reciprocal rotator had been used to rotate the ellipse $\gamma°$ in the opposite direction (i.e., back to $\theta°$). Instead, since non-reciprocal rotator rotated the ellipse to $(\theta+2\gamma)°$, quarter wave plate 63 changes the elliptical polarization of beam 80d to a different elliptical polarization oriented at a different angle, $\psi$, as illustrated by 80e in FIG. 5B(ii). The actual angle $\psi$ can be easily calculated, but it is not important to the present invention to know this angle.

Since the input light 80e to polarizer 61 in this direction is elliptically polarized, polarizer 61 will only transmit a fraction of this beam which is linearly polarized and oriented at 0°. Accordingly, an attenuated, linearly polarized beam 80f, as illustrated in FIG. 5B(i), will be output to the fiber 34 from linear polarizer 61. Beam 80f also is phase shifted relative to counter propagating beam 72f as explained hereinbelow.

Referring now to FIG. 3, after beams 72 and 80 exit attenuator 60 and reach mirror 36, reflected beam 72r and transmitted beam 80t interfere with each other. Beam 80t will be phase shifted and attenuated relative to beam 72r due to the passage through attenuator 60. Of course, beams 80t and 72r have an additional relative phase shift due to the non-linear properties of the fiber and the fact that they have different intensities (due to the attenuation in attenuator 60). Beam 44 which is incident on mirror 38 is the combination of beams 72r and 80t. Output light 40 is simply a portion of combined incident beam 44. The beam traveling in the opposite direction (comprising beams 80r and 72t) will also strike output mirror 38, but from the opposite direction. Therefore, the portion of that light which is reflected by mirror 38 is reflected in the opposite direction from output beam 40, as illustrated by beam 41. Therefore, it is removed from the system without interfering with output beam 40.

The change in the amplitude of the light traveling in the counterclockwise direction through attenuator 60 relative to the light traveling in the clockwise direction through attenuator 60 is given by:

$$\frac{\text{Beam 80}}{\text{Beam 72}} = \cos2\gamma + i \cdot \sin2\theta \cdot \sin2\gamma \quad \text{(Eq. 1)}$$

Note that this equation expresses only the change caused by attenuator 60 and does not include phase change or gain occurring in the fiber. The first portion of this sum. i.e , $\cos 2\gamma$, constitutes the real part of the beam while the second part of this sum, $i \cdot \sin 2\theta \cdot \sin 2\gamma$, constitutes the imaginary part. (The symbol $i$ denotes $\sqrt{-1}$, a pure imaginary number). As will be understood by persons skilled in the art, the intensity of beam 80 relative to the intensity of beam 72 is, therefore, given by;

$$(\cos 2\gamma)^2 + \sin 2\gamma \cdot \sin 2\theta)^2 \quad \text{(Eq. 2)}$$

and the relative phase shift between the two beams is given by $$\text{Arctan}\left(\frac{\sin 2\gamma \cdot \sin 2\theta}{\cos 2\gamma}\right) \quad \text{(Eq. 3)}$$

The angles $\theta$ and $\gamma$ are chosen to achieve the desired interference pattern. For instance, if the desired output is a pulse train of evenly spaced pulses of equal amplitude, then, as previously noted, the desired frequency domain characteristic is a plurality of resonant modes in the cavity which are in phase and have equal frequency spacing. Accordingly, the angles $\theta$ and $\gamma$ will be selected to achieve the necessary phase shift and attenuation between beams 72r and 80t to cause an interference pattern between the two beams which, after several passes through the cavity, will cause the resonant modes in the cavity to evolve to the desired frequency domain characteristics (i.e., equal frequency spacing and in phase).

Figure 6:
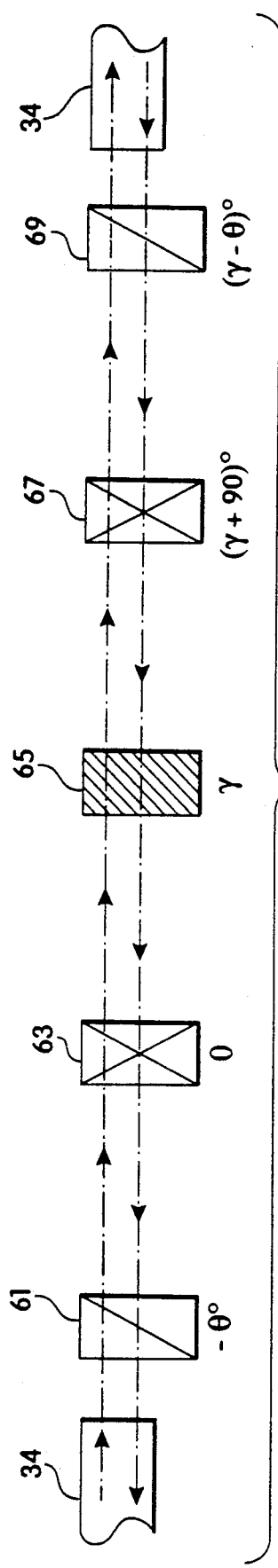
FIG. 6 is a second illustration of the unidirectional attenuator of the present invention.

The derivation of Equation 1 is described below. First, the case of light traveling from left to right in FIG. 4 (the forward direction), which is not attenuated will be considered. Further, for ease of explanation, it will be assumed that the incoming light has amplitude 1 and is linearly polarized at angle $-\theta°$ by polarizer 61. Accordingly, the axes of all other components must be rotated $-\theta°$ to maintain the axis relations of the invention as discussed above with respect to FIGS. 4, 5A and 5B. FIG. 6 illustrates the components and their relative angles for this case. As shown therein, polarizer 61 is oriented at $-\theta°$, quarter wave plate 63 is oriented at $0°$, quarter wave plate 67 is oriented at $(\gamma+90)°$ and polarizer 69 is oriented at $(\gamma-\theta)°$.

The output of polarizer 61, which is linearly polarized and oriented at angle $-\theta$ can be represented by the matrix;

$$(\cos\theta \; -\sin\theta)$$

The operation of quarter wave plate 63 having its axis oriented at $0°$ upon the light can be represented by the matrix;

$$\begin{pmatrix} 1 & 0 \\ 0 & i \end{pmatrix}$$

The Faraday rotator rotates the polarization of the light by $\gamma°$. If we assume the axes of all elements subsequent to the Faraday rotator, i.e., second quarter wave plate 67 and polarizer 69, are rotated by negative $\gamma°$ from their actual orientation, we can ignore the effect of Faraday rotator 65. Second quarter wave plate 67 would then be considered to have an axis of $90°$ instead of $(\gamma+90)°$ and, therefore, can be represented by the matrix;

$$\begin{pmatrix} i & 0 \\ 0 & 1 \end{pmatrix}$$

Since we are concerned only with relative phase shift between the forward and backward light in the attenuator, we can further assume that the forward light has no phase shift. Accordingly, the above matrix can be multiplied by $-i$ and rewritten as;

$$\begin{pmatrix} i & 0 \\ 0 & 1 \end{pmatrix} \cdot -i = \begin{pmatrix} 1 & 0 \\ 0 & -i \end{pmatrix}$$

This multipication by $i$ will need to be factored into the calculations relating to the backward traveling light when we come to that point. Thus, the effect of passing through the two quarter wave plates and the rotator in the first direction is given by;

$$\begin{pmatrix} 1 & 0 \\ 0 & -i \end{pmatrix} \cdot \begin{pmatrix} 1 & 0 \\ 0 & i \end{pmatrix} = \begin{pmatrix} 1 & 0 \\ 0 & 1 \end{pmatrix}$$

The light will then pass through polarizer 69, whose axis is now considered to be oriented at $-\theta°$ after the $-\gamma°$ rotation. The matrix operation performed by polarizer 69, therefore, is;

$$(\cos\theta)$$
$$(-\sin\theta)$$

Thus, the overall effect of passing through the attenuator in this direction is;

$$(\cos\theta \; -\sin\theta) \cdot \begin{pmatrix} 1 & 0 \\ 0 & 1 \end{pmatrix} \cdot \begin{pmatrix} \cos\theta \\ \sin\theta \end{pmatrix} = 1$$

Thus, the output light is unchanged in amplitude and the phase has been set to 0 in this case.

We will now consider light traveling in the opposite direction (the backward direction) through the same attenuator. We can assume that the axes of all elements prior to the Faraday rotator (in this case, polarizer 69 and quarter wave plate 67) are rotated by $-\gamma°$ from their actual axes, if we consider there to be a $2\gamma°$ rotation between the second and first quarter wave plates instead of the actual Faraday rotation of only $\gamma°$. This $2\gamma°$ rotation can be represented by the matrix;

$$\begin{pmatrix} \cos 2\gamma & \sin 2\gamma \\ -\sin 2\gamma & \cos 2\gamma \end{pmatrix}$$

As explained above with respect to the forward light through this attenuator, the operation of the second quarter wave plate 67 which is not accounted for in the matrix immediately above is represented by the matrix;

$$\begin{pmatrix} i & 0 \\ 0 & 1 \end{pmatrix}$$

However, in the forward direction, we multiplied this matrix by $-i$ to adjust the forward phase shift to 0°. Accordingly, we must make the same compensation in the backward direction. Accordingly, the above matrix is transformed to:

$$\begin{pmatrix} i & 0 \\ 0 & 1 \end{pmatrix} \cdot -i = \begin{pmatrix} 1 & 0 \\ 0 & i \end{pmatrix}$$

First quarter wave plate 63 also imparts a quarter wave shift. This operation is represented by the matrix;

$$\begin{pmatrix} 1 & 0 \\ 0 & i \end{pmatrix}$$

Accordingly, the operation on the light passing through second quarter wave plate 67, Faraday rotator 65, and first quarter wave plate 63 in this direction is given by the matrix;

$$\begin{pmatrix} 1 & 0 \\ 0 & i \end{pmatrix} \cdot \begin{pmatrix} \cos 2\gamma & \sin 2\gamma \\ -\sin 2\gamma & \cos 2\gamma \end{pmatrix} \cdot \begin{pmatrix} 1 & 0 \\ 0 & -i \end{pmatrix} = \begin{pmatrix} \cos 2\gamma & -i\sin 2\gamma \\ -i\sin 2\gamma & \cos 2\gamma \end{pmatrix}$$

The polarizers 69 and 61 only pass a signal having an amplitude which is the projection of the signal input thereto onto the axis of the polarizer. Accordingly, after factoring in the $-\gamma°$ rotation from its actual axes as discussed above, the operation of polarizer 69 is given by;

$$\begin{pmatrix} \cos\theta \\ -\sin\theta \end{pmatrix}$$

The operation of polarizer 61 is given by;

$$(\cos\theta \quad -\sin\theta)$$

Accordingly, the complete operation of all five elements, 61, 63, 65, 67 and 69, on the light passing through the attenuator in this direction is given by the matrix;

$$(\cos\theta \quad -\sin\theta) \cdot \begin{pmatrix} \cos 2\gamma & -i\sin 2\gamma \\ -i\sin 2\gamma & \cos 2\gamma \end{pmatrix} \cdot \begin{pmatrix} \cos\theta \\ -\sin\theta \end{pmatrix}$$

This reduces to $$= \cos^2\theta \cdot \cos 2\gamma + i \cdot \sin\theta \cdot \cos\theta \cdot \sin 2\gamma +$$
$$i\sin\theta \cdot \cos\theta \cdot \sin 2\gamma + \sin^2\theta \cos 2\gamma$$
$$= \cos 2\gamma + i\sin 2\gamma \sin 2\theta$$

This last equation is Equation 1.

In the currently preferred embodiment, the reflectivity of mirror 36 is approximately 10%, the recommended attenuation is approximately 10-15 dB, the ring length is approximately 2 to 3 meters, the gain is approximately 10-20 dB (this is saturated under the lasing condition) and the phase shift in the attenuator is approximately 90°. To achieve a phase shift of 90°, $\cos 2\gamma$ in Equation 1 should be very small, which means that non reciprocal rotation angle, $\gamma°$, should be approximately 45°.

Figure 7:
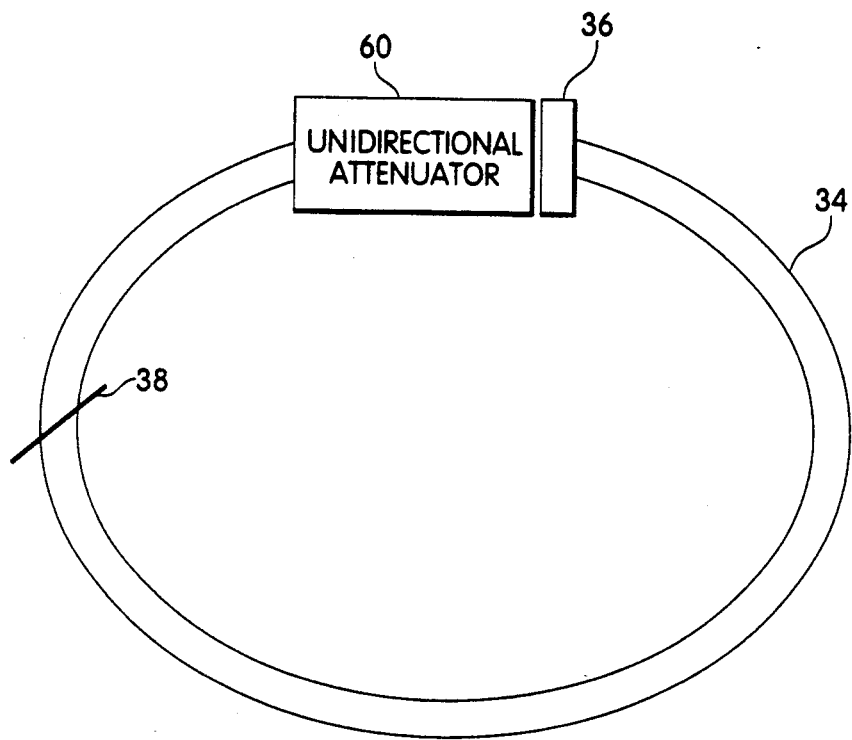
FIG. 7 illustrates a second embodiment of the laser of the present invention.

In the preferred embodiment of the invention, the Faraday rotator is a 45° rotator. Also, in the preferred embodiment, mirror 36 is formed at the juncture 60a or 60b where the attenuator and fiber are coupled. The primary reason for placing the mirror 36 here is that, as a matter of practical construction, it is easier to place a mirror here than to "break" the cable in a second location to form a reflective surface there. The mirror 36, for instance, may be a partially reflective/partially transmissive coating on the fiber at facet 60a or 60b as illustrated in FIG. 7.

Figure 8:
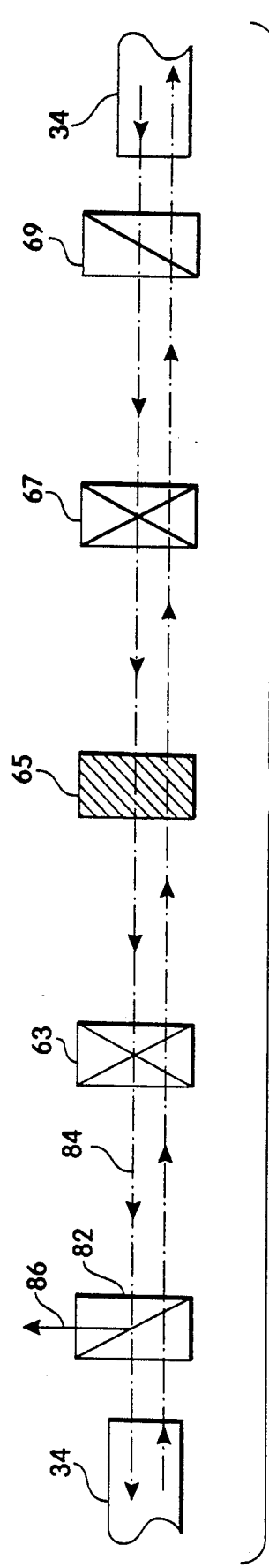
FIG. 8 illustrates an alternate embodiment of the attenuator portion of the laser of the present invention.

Output mirror 38 may be eliminated if, instead of utilizing simply a linear polarizer for first polarizer 61, a linear polarization beam splitter 82 is employed, as illustrated in FIG. 8. In this embodiment, the polarization beam splitter 82 will remove a portion of only that light traveling in the ring in the direction of arrow 84. Since this light is elliptically polarized as illustrated by FIG. 5B(ii) and, therefore, has components in both orthogonal directions, a portion of this beam will be reflected as output beam 86 by the polarization beam splitter 82. Light traveling in the other direction through polarization beam splitter 82 is linearly polarized at the polarization axis of the element 82 and, therefore, will pass through entirely.

It should be understood by those skilled in the art that it is only the first polarizer 61 which may be replaced with polarization beam splitter 82 to obtain an output signal. Second polarizer 69 receives light from both directions which is linearly polarized, as illustrated by FIGS. 5A(v) and 5B(vi) and, therefore, will not remove any light in either direction from the cavity.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An optical ring additive pulse mode-locked laser comprising;

a ring laser cavity forming a closed loop light path having gain and a non-linear propagation characteristic, an output port in said ring, a partially reflective/partially transmissive element positioned in said ring such that a light beam impinging upon said element in said closed loop light path is separated into a transmitted beam which is transmitted through said element and a reflected beam which is reflected by said element, and a unidirectional attenuator in said ring which attenuates and phase shifts a light beam traveling through said attenuator in a first direction relative to a light beam traveling through said attenuator in a second direction such that a mode-locking interference pattern develops in the ring.

2. An additive pulse mode-locked laser as set forth in claim 1 wherein said attenuator comprises in sequence;
a first linear polarizer,
a first quarter wave plate,
a non-reciprocal rotator,
a second quarter wave plate,
a second linear polarizer.

3. An additive pulse mode-locked laser as set forth in claim 2 wherein;
said first linear polarizer is oriented with its axis at a first angle,
said first quarter wave plate is oriented with its axis at an angle $\theta$ relative to said first angle,
said non reciprocal rotator rotates incident light by $\gamma$ degrees,
said second quarter wave plate is oriented with its axis at an angle $\theta+\gamma+90$ relative to said first angle, and
said second linear polarizer is oriented with its axis at an angle $\gamma$.

4. An additive pulse mode locked laser as set forth in claim 3 wherein said partially reflective/partially transmissive surface is formed at a location in said ring adjacent said attenuator.

5. An additive pulse mode locked laser as set for in claim 3 wherein said cavity comprises
an optical fiber having gain and a non linear propagation characteristic, said optical fiber formed into a closed loop so as to partially comprise said ring, said fiber being interfaced to said attenuator, said output coupler and said partially reflective/partially transmissive surface.

6. An additive pulse mode-locked laser as set forth in claim 5 wherein said partially reflective/partially transmissive surface comprises a facet of said optical fiber adjacent said attenuator.

7. An additive pulse mode-locked laser as set forth in claim 5 wherein said optical fiber is doped with Erbium.

8. An additive pulse mode-locked laser as set forth in claim 5 wherein said optical fiber comprises a linear polarization maintaining fiber having a particular axis of linear polarization maintenance and said fiber is coupled to said first linear polarizer at a first coupling point such that said axis of linear polarization maintenance is equal to said first angle at said first coupling point and said fiber is coupled to said second linear polarizer at a second coupling point such that said axis of linear polarization maintenance is at an angle equal to $\gamma$ at said second coupling point.

9. An additive pulse mode-locked laser as set forth in claim 5 wherein said first linear polarizer is a polarization beam splitter and said output coupler is said polarization beam splitter.

10. An additive pulse mode-locked laser as set forth in claim 1 wherein said cavity comprises;
an optical fiber having gain and a non-linear propagation characteristic, said optical fiber formed into a closed loop so as to partially comprise said ring, and said fiber being interfaced to said attenuator, said output coupler and said partially reflective/partially transmissive surface.

11. An additive pulse mode-locked laser as set forth in claim 10 wherein said optical fiber comprises a linear polarization maintaining fiber having a particular axis of linear polarization maintenance, said fiber being coupled to said attenuator at a first coupling point such that said axis of linear polarization maintenance is at a first angle and wherein said attenuator comprises;
a first quarter wave plate coupled to said fiber at said first coupling point, said first quarter wave plate being oriented with its axis at an angle $\theta$ relative to said first angle,
a non-reciprocal rotator, said non-reciprocal rotator rotating incident light by $\gamma$ degrees, and
a second quarter wave plate, said second quarter wave plate being oriented with its axis at an angle $\theta+\gamma+90$ relative to said first angle, said second quarter wave plate being coupled to said second linear polarizer at a second coupling point such that said axis of linear polarization maintenance is at an angle of $\gamma°$ at said second coupling point.

12. An additive pulse mode-locked laser as set forth in claim 1 wherein said output coupler comprises a partially reflective/partially transmissive surface.

13. An optical fiber ring additive pulse mode-locked laser comprising;
an optical fiber having gain and a non-linear propagation characteristic, said optical fiber formed into a closed loop so as to partially comprise said ring,
a first partially reflective/partially transmissive mirror in said ring oriented such that light which is reflected off of said surface is removed from said ring as an output signal,
a second partially reflective/partially transmissive mirror in said ring generally perpendicular to the direction of travel of light in said ring, and
a unidirectional attenuator in said ring which attenuates and phase shifts light traveling through said attenuator in a first direction relative to light traveling through said attenuator in a second direction said unidirectional attenuator comprising;
a first linear polarizer, said first linear polarizer being oriented with its axis at a first angle,
a first quarter wave plate, said first quarter wave plate being oriented with its axis at an angle $\theta$ relative to said first angle,
a non reciprocal rotator, said non reciprocal rotator rotates incident light by $\gamma$ degrees,
a second quarter wave plate, said second quarter wave plate being oriented with its axis at an angle $\theta+\gamma+90$ relative to said first angle, and
a second linear polarizer, said second linear polarizer is oriented with its axis at an angle $\gamma$.

14. An optical fiber ring additive pulse mode-locked laser as set forth in claim 13 wherein said optical fiber comprises a linear polarization maintaining fiber having a particular axis of linear polarization maintenance and said fiber is coupled to said first linear polarizer at a first coupling point such that said axis of linear polarization maintenance is equal to said first angle at said first coupling point and said fiber is coupled to said second linear polarizer at a second coupling point such that said axis of linear polarization maintenance is $\gamma$ at said second coupling point.

15. A ring additive pulse mode-locked laser comprising;
a linear polarization maintaining optical fiber having gain and a non-linear propagation characteristic, said optical fiber formed into a closed loop so as to partially comprise said ring, said fiber having a particular axis of linear polarization maintenance,
a first partially reflective/partially transmissive mirror in said ring oriented such that light which is reflected off of said surface is removed from said ring as an output signal, a second partially reflective/partially transmissive mirror in said ring generally perpendicular to the direction of travel of light in said ring, and a unidirectional attenuator in said ring which attenuates and phase shifts light traveling through said attenuator in a first direction relative to light traveling through said attenuator in a second direction said unidirectional attenuator comprising;

a first quarter wave plate, said first quarter wave plate being oriented with its axis at an angle $\theta$ relative to said first angle, a non reciprocal rotator, said non-reciprocal rotator rotates incident light by $\gamma$ degrees, and a second quarter wave plate, said second quarter wave plate being oriented with its axis at an angle $\theta + \gamma + 90$ relative to said first angle, and wherein said fiber is coupled at opposite ends thereof to said first and second quarter wave plates, respectively, and said fiber is twisted such that said axis of linear polarization maintenance of said fiber is oriented at said first angle at said first quarter wave plate and is oriented at $\gamma$ at said second quarter wave plate.

* * * * *